C. U. CRANDALL.
Improvement in School-Desk Joints.
No. 114,649.  Patented May 9, 1871.
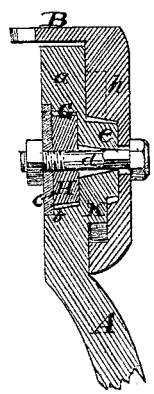
Fig.1.
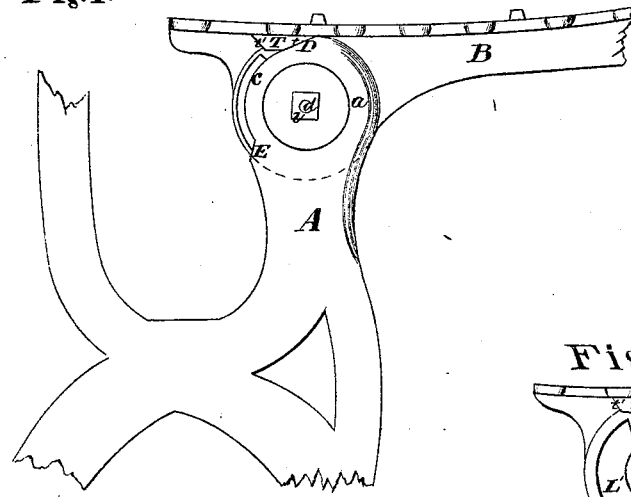
Fig.3.
Fig.2
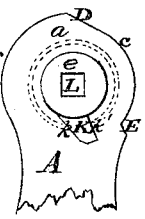
Fig.4.
Witnesses
Cha Kenyon
Villette Anderson
Inventor.
C. U. Crandall
Chipman Hosmer & Co
Attys

United States Patent Office.

CYPRIAN U. CRANDALL, OF STERLING, ILLINOIS.

Letters Patent No. 114,649, dated May 9, 1871.

IMPROVEMENT IN SCHOOL-DESK JOINTS.

The Schedule referred to in these Letters Patent and making part of the same.

*To all whom it may concern:*

Be it known that I, CYPRIAN U. CRANDALL, of Sterling, in the county of Whiteside and State of Illinois, have invented a new and valuable Improvement in "School-Desk Joints;" and I do hereby declare that the following is a full, clear, and exact description of the construction and operation of the same, reference being had to the annexed drawing making a part of this specification and to the letters and figures of reference marked thereon.

Figure 1 of the drawing is a side view of the joint.

Figure 2 is a central vertical transverse section of the same.

Figure 3 is an inside view of the expansion on the end of the seat-arm.

Figure 4 is an inside view of the head of the pedestal.

My invention has relation to an improved joint for the seats of school-desks; and It consists in the construction and novel arrangement of devices designed to secure facility of action and at the same time to prevent shock and noise.

The letter A of the drawing designates the stationary arm or pedestal, which rises from the floor and serves as a support for the seat.

B represents the arm of the seat, attached to the upper end of the pedestal A by the friction-joint now to be described.

The upper end of the arm A is circular in form on the front side, but cut away or depressed on the rear side, at $c$, thus forming a circular bearing surface of smaller diameter, which is connected with the larger exterior circle of the head by the inclined planes or stops D and E.

In the exterior surface of the head $a$ of the pedestal A a countersink, G, is formed, about the mouth of the bolt-hole, to receive the rubber packing H, which is made somewhat smaller in diameter than the countersink G.

The lip of the countersink may be set out a little to form a ledge, $b$, for the washer $c'$ to rest on when pressed home by the nut on the end of the bolt.

From the inner side of the head $a$, concentric with the bolt $d$, extends inward a circular projection or journal, $e$, adapted to be seated within a circular recess formed in the end of the seat-arm.

From the base of the journal $e$ extends outward and downward a wedge-shaped projection, K, the inclined sides $k\ k'$ of which operate as stops in the manner hereinafter described.

The bore $l$, through the center of the head $a$, is in its vertical cross-section square, to fit the squared end $d'$ of the bolt, but widens or flares from its inner end to its outer end or mouth in the bottom of the countersink G.

A circular expansion, $h$, is formed on the end of the arm B, and is designed to work in contact with the inner face of the head of the stationary arm A.

The inner surface of the expansion $h$ is recessed at $m$ to receive the journal $e$; but it is made larger than the journal to provide for a certain amount of play.

L' represents a sector-shaped offset to the circular recess $m$, in which the wedge-shaped stop K moves. The ends of this depressed way L are formed on different angles to suit the sides $k\ k'$ of the stop. These ends are respectively lettered $u\ u'$.

The opening $v$ in the center of the recess $m$ is for the passage of the bolt; but this opening is made of larger diameter than the bolt in order to allow a certain amount of play.

T represents a wedge-shaped stop, formed on the under side of the arm B. Its bearing surfaces $t\ t'$ are differently inclined to suit the degree of inclination respectively of the ends D and E of the depression $c$, at the rear part of the edge of the stationary head $a$, above described.

The nut $v$ is designed to work against the washer $a'$, and serves to tighten the parts when they become loose.

A washer may be employed between the head of the bolt and the side of the expansion $h$.

It is designed that when the seat is folded up the stops $t'$ E and $k'\ u'$ shall be in contact respectively. When the seat is down the stops $t$ D and $k\ u$ are in contact.

The object of using a double set of stops in each case is twofold:

In the first place, as one set is always acting on the edge of the head $a$ while the other set operates more directly against the expansion $h$, the two disk-like portions of the joint are kept in equilibrium and lateral straining is avoided.

Secondly, the stops $k\ u$ and $k'\ u'$ within the joint are adapted to act a little in advance of the stops $t'$ E and $t$ D, which are external—this action being provided for by the play of the bolt $d$ and journal $e$ in their respective bearings. The noise of contact is deadened, being first received by the inner stops, and on account of the inclined position of the external stops the contact between them is gradual and without shock.

The rubber cushion or packing serves to keep the joint always tight, and serves, in connection with the friction surfaces within the joint, to keep the seat fixed at any angle. Therefore it cannot fall by its own weight, but must be pushed down by hand if the joint is properly tightened.

Having thus fully described my invention,

What I claim as new, and desire to secure by Letters Patent, is—

1. In a hinge-joint for school-seats, the internal stops u' k', in combination with the external stops C E and t D, so arranged that said internal stops shall act a little in advance of the external stops, substantially as specified.

2. The pedestal A, provided with the rubber packing H, journal e, inclined projection K, recess c, and tapering bore L, in combination with the bolt d and the arm B, provided with the recess m L and projection T, substantially as specified.

In testimony that I claim the above I have hereunto subscribed my name in the presence of two witnesses.

CYPRIAN U. CRANDALL.

Witnesses:
M. S. McDEARMON,
J. E. McPHERRAN.